United States Patent [19]

Hydorn

[11] Patent Number: 4,640,007
[45] Date of Patent: Feb. 3, 1987

[54] APPARATUS AND METHOD FOR REPLACING BEARINGS IN A WALKING BEAM IN TRUCKS AND TRAILERS HAVING TANDEM AXLES

[76] Inventor: Ronald Hydorn, 6820 54th St. NE., Marysville, Wash. 98270

[21] Appl. No.: 680,289

[22] Filed: Dec. 10, 1984

[51] Int. Cl.$^4$ .......................... B23P 21/00; B23P 7/00; B23P 19/02; B23Q 15/00
[52] U.S. Cl. ................................. 29/709; 29/402.02; 29/402.08; 29/426.4; 29/714; 29/720; 51/2 R; 51/72 R; 51/80 A; 51/98 R; 51/109 R; 51/134.5 R; 51/216 R; 51/238 R; 51/281 R; 83/471.2; 83/483; 83/490; 83/491
[58] Field of Search ............ 29/426.4, 402.02, 402.03, 29/402.08, 557, 700, 709, 714, 720; 51/2 R, 71, 72 R, 80 R, 80 A, 98 R, 109 R, 134.5 R, 215 R, 216 R, 238 R, 240 R, 281 R; 83/471.2, 483, 490, 491

[56] References Cited

U.S. PATENT DOCUMENTS

| | | | |
|---|---|---|---|
| 2,257,480 | 9/1941 | Perazzoli | 51/98 R X |
| 2,291,058 | 7/1942 | Pohl | 51/72 R X |
| 2,671,991 | 3/1954 | Thorsell | 51/80 X |
| 2,740,236 | 4/1956 | Flygare et al. | 51/2 R X |
| 3,016,931 | 1/1962 | Brunkow et al. | 83/471.2 X |
| 3,032,956 | 5/1962 | Mullet | 83/483 X |
| 3,183,585 | 5/1965 | West | 29/402.08 X |
| 3,325,946 | 6/1967 | Lange | 83/483 X |
| 3,905,160 | 9/1975 | McKenney | 51/281 R X |
| 4,091,518 | 5/1978 | Rutherford | 29/402.08 X |

OTHER PUBLICATIONS

Technical Service Manual TS-102, RT/RTE Series; Hendrickson Mfg./Tandem Division; Burr Ridge, Ill.
Service Manual TS-105, SR Series; Hendrickson Mfg./Tandem Division; Burr Ridge, Ill.

Primary Examiner—Howard N. Goldberg
Assistant Examiner—R. S. Wallace
Attorney, Agent, or Firm—Thomas W. Secrest

[57] ABSTRACT

This invention is directed to the removal and also to the replacement of a beam end connection assembly in a walking beam. A walking beam comprises a beam hanger axle bracket and also an equalizer beam. The beam end connection assembly comprises an inner tube and a rubber bushing. The inner tube is positioned in the beam hanger axle bracket and also in the equalizer beam. The rubber bushing is between the inner tube and the equalizer beam. The rubber bushing and the inner tube are severed, preferably, simultaneously. Then, the remnants of the inner tube and the rubber bushing can be removed from the beam hanger axle bracket and the equalizer beam. Then, it is possible to install a new beam hanger connection assembly in the beam hanger axle bracket and the equalizer beam.

22 Claims, 21 Drawing Figures

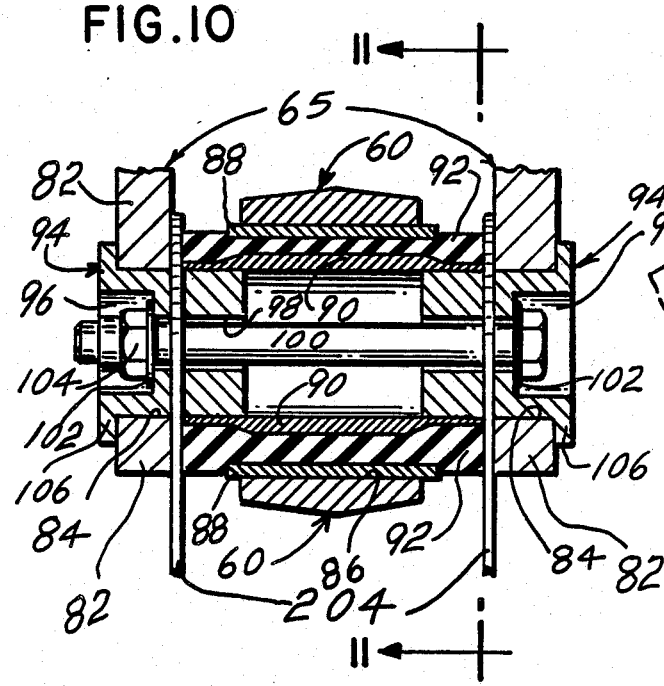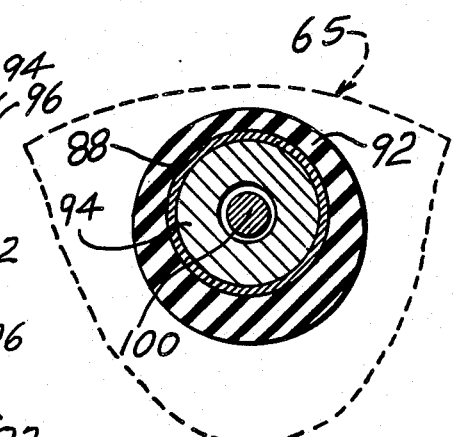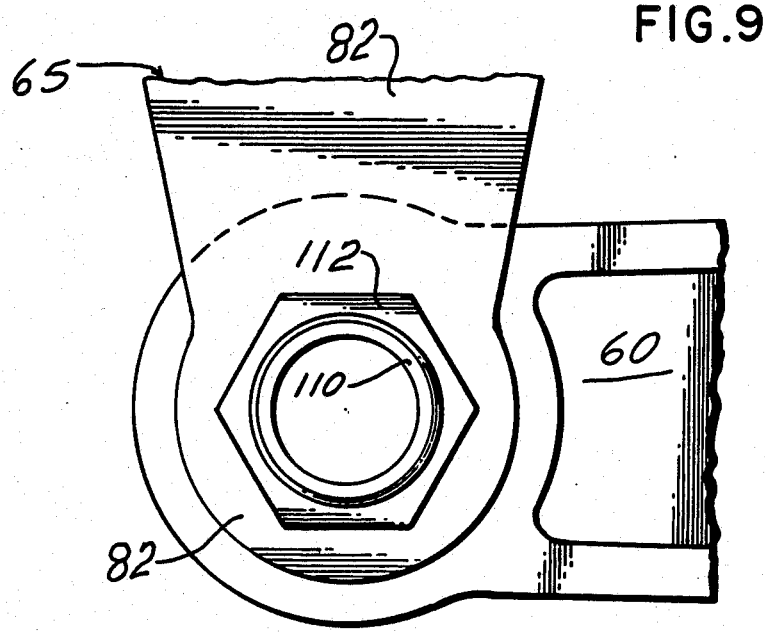

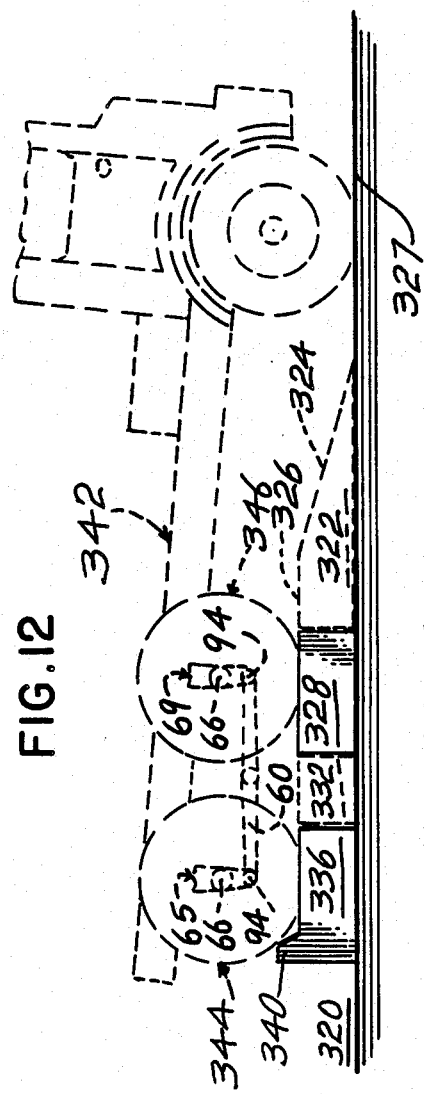
FIG.12
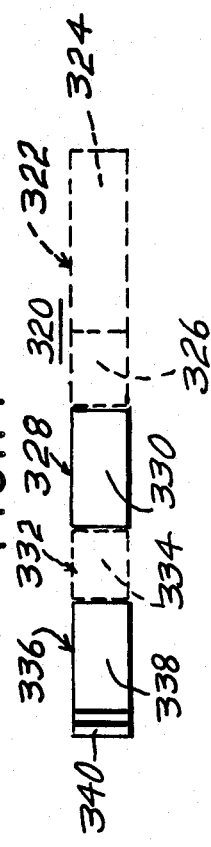
FIG.14
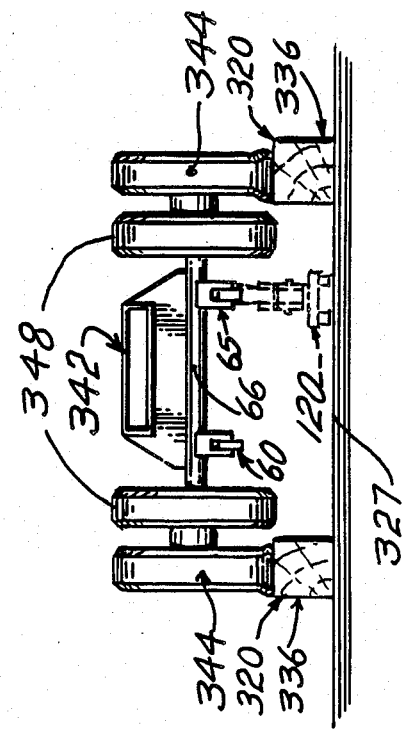
FIG.13
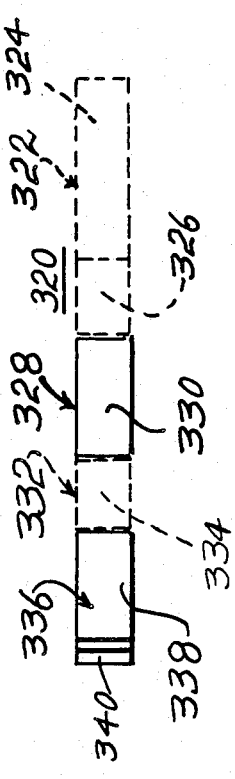

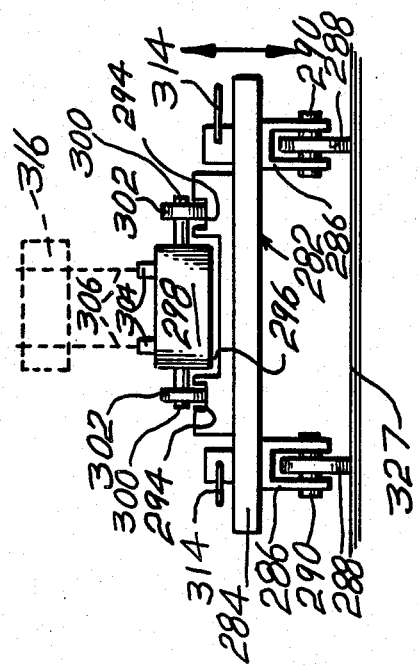

APPARATUS AND METHOD FOR REPLACING BEARINGS IN A WALKING BEAM IN TRUCKS AND TRAILERS HAVING TANDEM AXLES

THE BACKGROUND OF THE INVENTION

In some trucks and heavy duty trailers there is a unit of four supporting wheels and tires. The unit comprises walking beams. In such a unit there are two walking beams. Also, there are four bushings in such a unit.

In a tandem axle truck such as a dump truck there are eight wheels in a unit and four bushings in a unit having two walking beams and tandem drive axles. A tandem axle dump truck hauls and conveys a heavy load such as dirt, sand, gravel and rocks. The tandem axle dump truck is used both on the highway and off the highway. Quite often, when the tandem axle dump truck is used off of the highway the terrain is rough, bumpy, and has recesses which are hard on the truck and the walking beam. In these situations the bushings in the walking beam must be replaced at approximately 50,000 miles to 60,000 miles. The bushings are subject to considerable punishment and if the bushings are not replaced the truck does not handle properly and is difficult to manuever and work and can be a hazard to drive. Also, the side walls of the tire may fail.

A tandem axle logging truck is used both on the highway and off of the highway. Some logging trucks will have a walking beam unit comprising four wheels and two bushings. Many times a logging truck travels relatively many miles on the highway and only a relatively few miles off of the highway. In these instances the bushings in the walking beam are not placed under pressure as much as the bushings in a dump truck and it is possible to secure 250,000 miles or maybe 300,000 miles on the bushings in a walking beam in a logging truck without the need for replacement.

Certain trailers may have a walking beam unit comprising four wheels and two bushings. Generally, trailers are used on the highway and since the highway is relatively smooth without recesses or dips the bushing does not take the beating that a bushing will take for an off highway truck such as a dump truck. In these instances it is possible to use bushings in a trailer for 250,000 to 300,000 miles.

In the walking beam there is a shaft and caps and also a rubber bushing surrounding the shaft. There surrounds the rubber bushing a hanger. With the wearing of the rubber bushing it is difficut to separate and to replace the rubber bushing after the walking beam has been used for a considerable number of miles or a considerable period of time. Between the shaft and the cap and also the rubber bushing there is some dirt, grime and some rust. To separate the cap from the shaft is difficult. If the cap can be separated from the shaft then the shaft can be forced out or pressed out of the rubber bushing. This allows the rubber bushing to drop and to be replaced with a new rubber bushing. The separation of the shaft and cap from the rubber bushing is a dirty, messy job. It is necessary to crawl under the truck or under the trailer. One way of separating the cap and the shaft is to use a chisel and to force apart the shaft and the cap. The cap is forced away from the shaft by using a hammer and chisel and manual labor. As there is a set of four wheels in a unit the time required to force apart the caps and shafts and to remove the old rubber bushing and to insert a new rubber bushing, a new shaft and a new cap is approximately 12 to 14 hours. This means that the truck or trailer is out of service for a period of 12 to 14 hours. The value of a truck in service or the value of a trailer in service is placed at about $100.00 per hour. Because the truck or trailer is out of service for 12 to 14 hours there is a loss of about $1200.00 to $1400.00 in the use of the truck or trailer. The loss of $1200.00 to $1400.00 is in addition to the cost of replacing the rubber bushing. The cost of the replacing of the rubber bushing is approximately $900.00.

Instead of using a hammer and a chisel to separate the cap and shaft it is possible to use a cutting torch. The flame of the cutting torch can be adjusted so as to cut through the rubber bushing and the shaft. The rubber bushing is burned away and also the shaft is burned away. Then, a new shaft and a new rubber bushing and new caps can be inserted. A drawback to the use of a burning torch or a cutting torch is the smell of burning rubber. It is necessary to have eight cuts or eight burns with the torch. The time to accomplish eight burns or eight cuts with the torch is approximately one and one-half hours to remove the shafts and rubber bushings. The total time to replace the rubber bushings in a unit of four wheels is approximately three hours. This means that there is a lose of time and a loss of money of about $300.00 in the replacing of the rubber bushings as the truck or trailer cannot be used. The manufacturer advises against the use of a cutting torch.

Another way of removing the rubber bushings, other than by a hammer and a chisel or a cutting torch, is by a saw.

A more complete discussion of walking beams and bushings is presented by Hendrickson Mfg. Co., P. 0. Box 249, Burr Ridge, Ill., 60521, see publications, SR SERIES and RT/RTE SERIES.

A bushing may be of a suitable plastic as well as of rubber.

THE GENERAL DESCRIPTION OF THE INVENTION

This invention is directed to the rapid replacement of the rubber bearings in a unit having walking beams and four wheels and tires.

The rubber bearing and the shaft is simultaneously severed in two places. The time to sever the rubber bearing and the shaft is approximately two minutes. Then, the caps can be knocked out of the hanger and new caps and new shafts inserted. The total time to replace four rubber bearings in such a unit is about two hours. With this invention there is less down-time for the truck or trailer. With the hammer and chisel method of replacing the rubber bearings the down-time is approximately twelve to fourteen hours. With the subject invention the down-time is about two hours. There is a saving in down-time of approximately ten hours to twelve hours. At a value of about $100.00 an hour for a truck or a trailer there is a saving of approximately $1,000.00 to $1,200.00 because of less down-time.

This invention is directed to the quick replacement of rubber bearings and shaft in a walking beam so as to have less down-time of the equipment such as a truck or trailer. With less loss of productive time or less down-time there is greater productive use of the truck and trailer. The operator of the truck or trailer or the truck driver can stop for about two hours to have the rubber bearings replaced as compared to stopping all day or overnight to have the rubber bearings replaced. Quite often, the operator or truck driver can stop for two hours and have something to eat and by the time there has been a long eating period the operator or truck driver can go back and pick up the truck or trailer, or both. With less time required to repair the rubber bearings in a walking beam less labor is required which results in a lower cost of repair. With this invention I consider that the cost of replacing the bushings in a walking beam will be less than the cost of replacing the bushings in a walking beam when a hammer and chisel is used.

THE DRAWINGS

Figure 19:
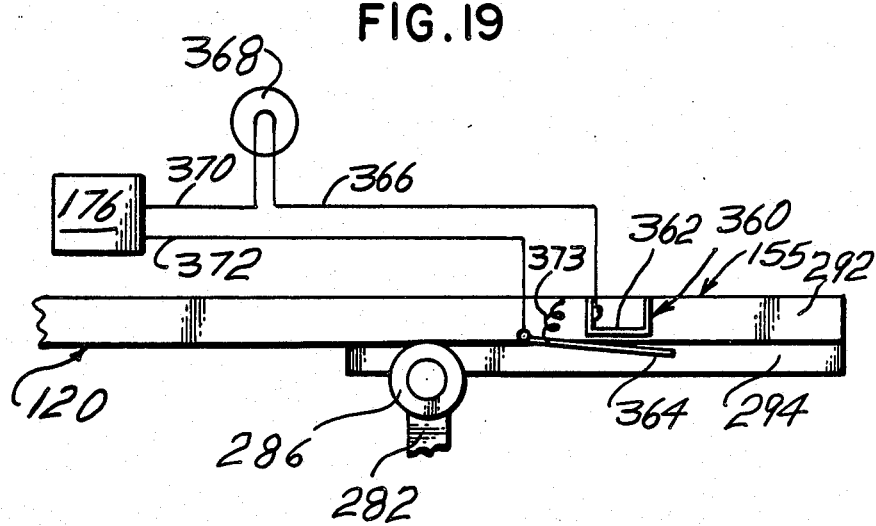
Figure 20:
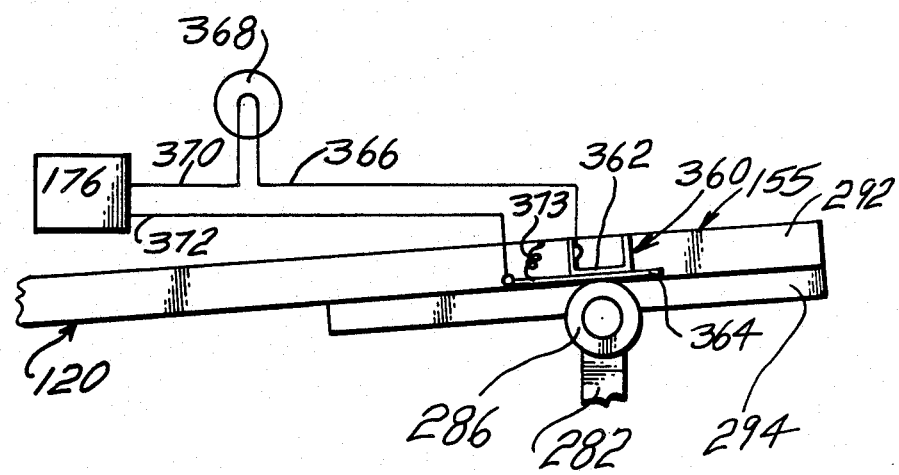
Figure 21:
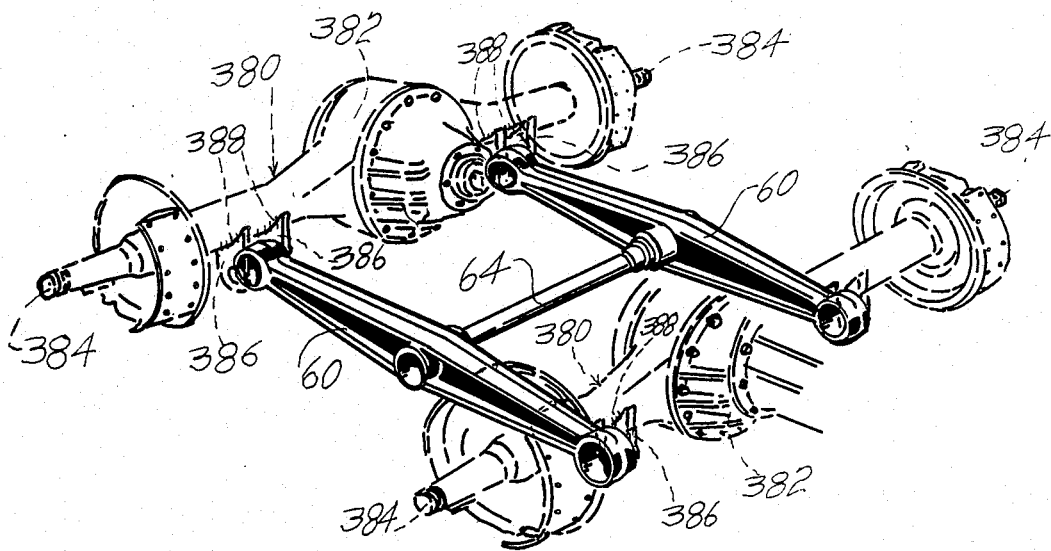

FIG. 9, on an enlarged scale, is a fragmentary side elevational view of a beam end connection assembly of the tube type connecting a beam hanger bracket and an equalizer beam assembly;

FIG. 10 is a fragmentary end elevational view illustrating the beam end connection assembly of the adapter type, which is connecting the beam hanger bracket and equalizer beam assembly, being severed by two spaced apart discs;

FIG. 11, taken on line 11—11 of FIG. 10, is a lateral cross sectional view illustrating the beam end connection assembly of the adapter type and the beam hanger bracket;

FIG. 12 is a side elevational view illustrating a truck on elevated supports and with the tires and wheels of the tandem assembly on the elevated supports and a ramp leading to the elevated supports;

FIG. 13 is a fragmentary end elevational view illustrating the outside tires and wheels of a tandem assembly on a truck on the elevated supports and with the invention in position underneath a tandem assembly to sever a beam end connection assembly;

FIG. 14 is a top plan view looking down on the spaced apart elevated supports and ramp upon which a truck or a trailer is positioned and said truck or trailer having a tandem assembly;

FIG. 15 is a side elevational schematic illustration of another species of the invention including a laser for severing the beam end connection assembly;

FIG. 16 is an end elevational view of the invention using a laser to sever a beam end connection assembly;

FIG. 17 is a side elevational view of another species of the invention illustrating shears for severing the beam end connection assembly;

FIG. 18 is an end elevational view of the other species of the invention illustrating shears for severing the beam end connection assembly;

FIG. 19 is a schematic illustration of an indicator for indicating the position of the wheels with respect to the rotatable platform and with the wheels not in contact with the switch;

FIG. 20 is a schematic illustration of the wheels in position with the switch on the rotatable platform to indicate the position of the wheels and also the rotatable platform; and, FIG. 21 is a fragmentary axonmetric view of a walking beam assembly operatively connecting with tandem axle units wherein the axle units are powered for moving the vehicle.

THE SPECIFIC DESCRIPTION OF THE INVENTION

This invention is directed to an apparatus and method for replacing the beam end connections in the equalizer beam of vehicles having tandem axles.

The method is for removing a beam end connection assembly in an equalizer beam. The method comprises, substantially, simultaneously severing an inner tube and a beam end bushing on both sides of said equalizer beam and between two legs of a beam hanger axle bracket. Then, the balance of the beam end connection assembly is removed from the equalizer beam and from the beam hanger axle bracket. After the beam end connection assembly has been removed then a new beam end connection assembly can be positioned in the equalizer beam and in the beam hanger axle bracket. The beam end connection assembly comprises an inner tube, a beam end bushing around said inner tube, and an outer tube around said beam end bushing. The beam end connection assembly is positioned in a beam hanger axle bracket and also is positioned in a equalizer beam. There is a means to maintain the beam end connection assembly in the beam hanger axle bracket and also in the equalizer beam. Again, after the first beam end connection assembly has been removed then a second beam end connection assembly can be positioned in the equalizer beam and the beam hanger axle bracket. This is for an adapter type of beam end connection assembly. There is also a tube type of beam end connection assembly whereby there is a beam end tube. The beam end tube is positioned in the beam hanger axle bracket. The ends of the beam end tube are threaded for receiving beam end tube nuts. The beam end tube nuts are on the outside of the beam hanger axle bracket so as to definitely position the beam end connection assembly in the beam hanger axle bracket and in the equalizer beam.

Figure 1:
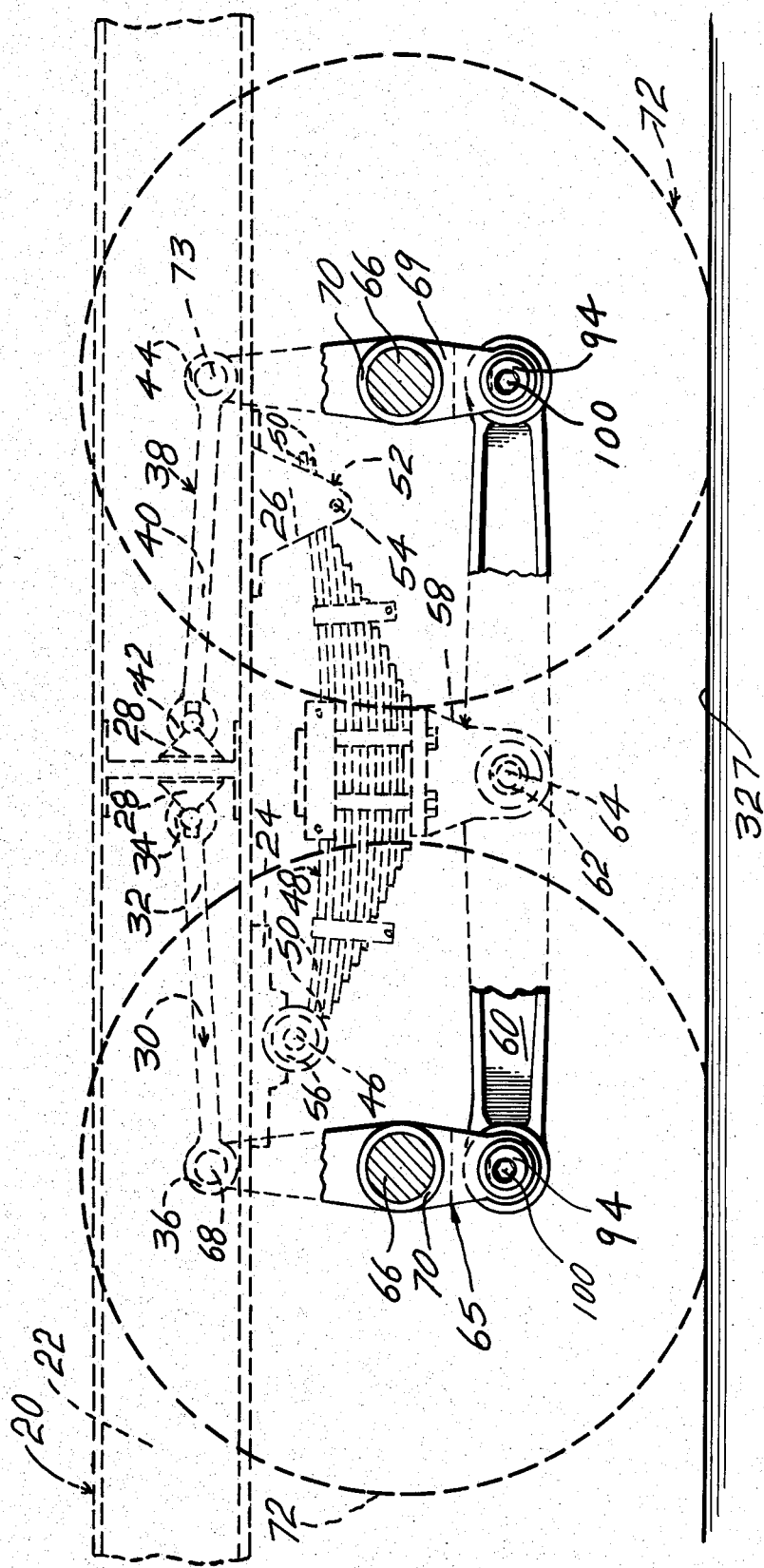
FIG. 1 is a side elevational view of a tandem assembly illustrating the equalizer beam assembly, the beam hanger bracket, the beam end adapter assembly, beam center cross tube, saddle and spring assembly, spring, spring hanger, torque rod axle bracket, torque rod assembly and torque rod frame bracket.
Figure 2:
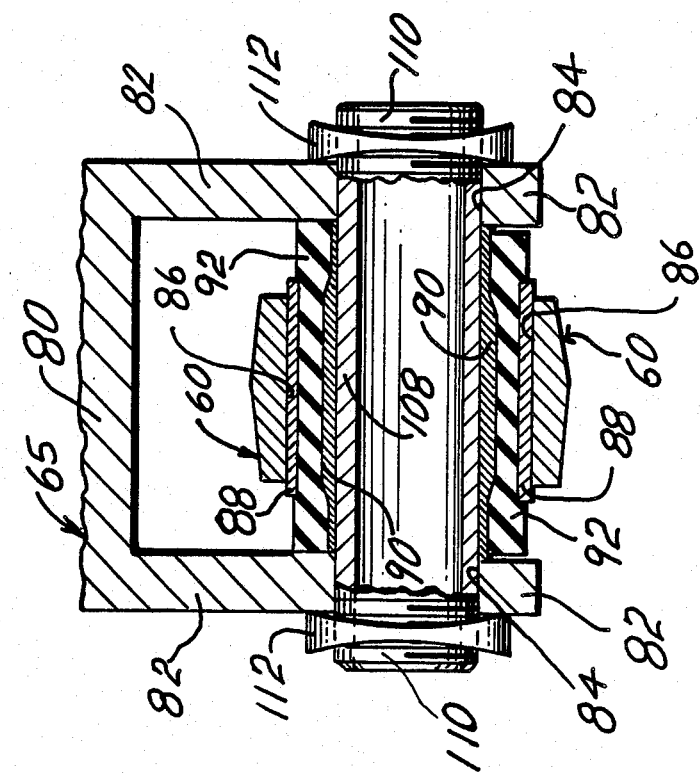
FIG. 2 is a fragmentary lateral cross-sectional view looking at a beam hanger axle bracket, an equalizer beam and a beam end adapter assembly of the adapter type.
Figure 3:
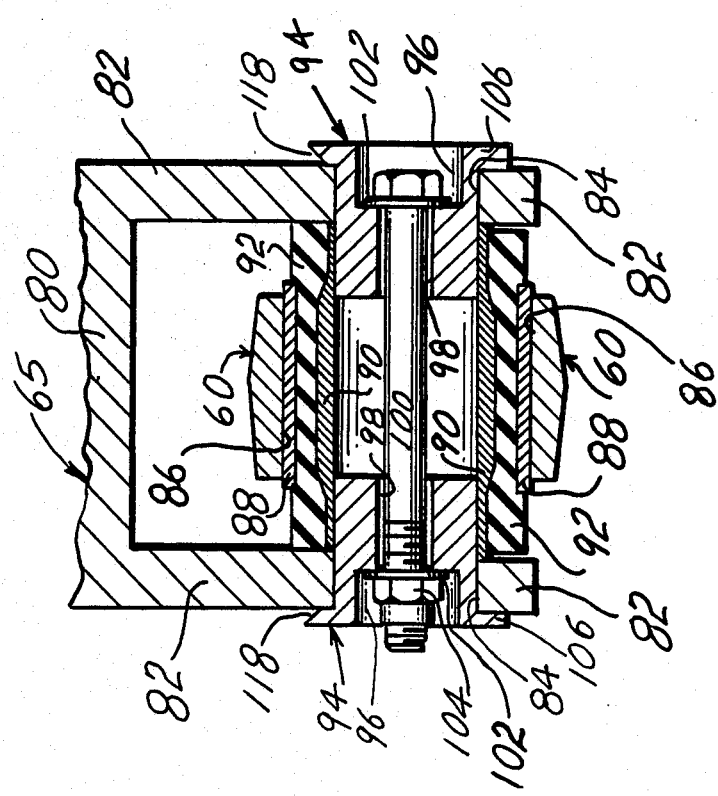
FIG. 3 is a fragmentary lateral cross-sectional view showing a beam hanger axle bracket, an equalizer beam and a beam end adapter assembly of the tube type.

Reference is made to FIG. 1 and also to FIGS. 2 and 3.

There is a vehicle 20 having a frame 22. The frame 22 may comprise an I-beam.

In FIG. 1 it is seen that at the left there is a spring hanger 24 and at the right there is a spring hanger 26.

At the central part of the frame 22 there is a torque rod frame bracket 28. Actually, there are two torque rod frame brackets 28. There is a torque rod assembly 30 having a rod 32 having on one end a connector 34 which connects with the torque rod frame bracket and on the other end a connector 36. Also, there is a torque rod assembly 38 comprising a rod 40 having a connector 42 on the left end and a connector 44 on the right end.

It is to be understood that the frame 22 on one side has a spring hanger 24 and on the other side has a spring hanger 24. A shaft 46 is on one side of the vehicle 20 and connects with a spring hanger 24.

In FIG. 1 it is seen that there is a spring assembly 48 comprising a number of leaves with the two top leaves being assigned the reference numeral 50.

Again, it is to be understood that on one side of the frame 22 there is a spring hanger 26 and on the other side of the frame 22 there is a spring hanger 26. The spring hanger 26 has a depending support 52. In the lower part of the depending support 52 there is a shaft 54 which runs laterally across the spring leaves 50 and is positioned in the spring hanger 26.

The two leaves 50 form a circular loop 56 around the shaft 46 connecting with the two spring hangers 24. The top leaves 50 of the spring assembly 46 rest on the lateral shaft 54 which is positioned in a spring hanger 26.

There is attached to the spring assembly 48 a saddle and spring assembly 58. The saddle and spring assembly 58 is supported by the spring assembly 48 and depends from the spring assembly 48. Again, it is to be understood that on each side or under each side of the frame 22 that there is a spring assembly 48 and a saddle and spring assembly 58. In other words, there are two spaced apart spring assemblies 48 and two spaced apart spring assemblies 58.

There is an equalizer beam 60. The central part of the equalizer beam 60 has a passageway 62. In the passageway 62 is a torque bar 64. The torque bar 64 runs between two spaced apart equalizer beams 60. The equalizer beams 60 are supported in the central part by the depending saddle and spring assembly 58.

There is a beam hanger bracket 65 on the trailer. In the beam hanger bracket 65 there is a non-driving axle 66. A shaft 68 connects the connector 36 or the torque rod assembly 30 with the beam hanger bracket 65. The axle 66 is in a housing 70 of the beam hanger bracket 65. The housing 70 houses the axle 66 which runs between four wheels 72, in phantom, on the left. There are two wheels each on each side for a total of four wheels. In a dump truck or a tractor there may be a driving axle in the beam hanger bracket wherein the bearing bracket is welded to the underside of the axle housing.

On the right there is a beam hanger bracket 69. The beam hanger bracket 69 connects with the shaft 73. The shaft 73 connects together the connector 44 or the torque rod assembly 38 and the beam hanger bracket 69. In the beam hanger bracket 69 there is a housing 70 for an axle 66. The axle 66 runs between four wheels 72, viz., two wheels on each side in phantom, on the right. The reader is to understand that there are four wheels associated with the spring assembly 48, the beam hanger bracket 65 and the beam hanger bracket 69, on each side of the vehicle.

The beam hanger bracket 65, see FIGS. 2 and 3, comprises a body 80 having two spaced-apart depending legs 82. In these figures it is seen that the body 80 and the two legs 82 resemble an inverted U.

In the lower part of each of the legs 82 is a passageway 84. The two passageways 84 are aligned.

Also, it is seen that the beam assembly 60 has a passageway 86. The diameter of the passageway 86 is larger than the diameter of the passageway 84.

There is an outer tube 88 of the beam end bushing. Then, there is an inner tube 90 of the beam end bushing. There is positioned between the outer tube 88 and the inner tube 90 a rubber beam end bushing 92.

The inner tube 90 has a first open end and a second open end. It is seen that the inner tube fits between the two spaced-apart depending legs 82. There is a first adapter 94 which fits in the first end of the inner tube 90 and there is a second adapter 94 which fits in the second end of the inner tube 90. It is seen that in each adapter that there is a cavity 96. Also, in each adapter there is a passageway 98. A bolt 100 is positioned in the two passageways 98 of the two adapters 94. A washer 102 is between the head of the bolt 100 and the adapter 94. Also, there is a nut 104 on the threaded end of the bolt 100 which is in the other cavity 96 of the second adapter 94. There is a washer 102 between the nut 104 and the adapter 94.

It is seen that the adapter 94 has a circumscribing ridge 106. The main body of the adapter 94 has a smaller external diameter than the internal diameter of the inner tube 90 so that the adapter can slide in the inner tube 90. The circumscribing ridge 106 of each adapter has a larger external diameter than the internal diameter of the passageways 84 and the leg 82. The nut 104 and the bolt 100 can be tightened so as to force the adapters 94 firmly in the inner tube 90. This definitely positions the rubber bushing 92 between the inner tube 90 and the outer tube 88. The outer tube 88 is in contact with the equalizer beam assembly 60. The rubber bushing 92 absorbs and alleviates some of the shock and stress encountered by the equalizer beam assembly 60 and also by the frame 22 of the vehicle 20. In time the rubber bushing becomes worn and ages and does not function as well as the bushing functioned when new. At this time it may be necessary to replace the rubber bushing 92. Again, for an off-highway vehicle such as a dump truck carrying a heavy load over rough terrain the bushing may have to be replaced at 50,000 miles to 60,000 miles. With an on-highway vehicle traveling mainly on asphalt and concrete roads and where the bushing does not receive undue wear and stress the bushing may last for 300,000 miles.

The beam end connection assembly of FIG. 2 is referred to as the adapter type.

In FIG. 3 there is illustrated a beam end connection assembly known as the tube type. The tube type is similar to the adapter type except there is a beam end tube 108. The inner tube 90 is around the beam end tube 108.

The beam end tube 108 is positioned inside of the inner tube 90 and also inside of the passageways 84 in the two spaced-apart depending legs 82. Further, the beam end tube 108 has a threaded first end and a threaded second end. Naturally, the outside diameter of the beam end tube 108 is less than the inside diameter of the passageways 84 and also less than the inside diameter of the inner tube 90.

The threaded ends of the beam end tube 108 are given reference numerals 110. A beam end tube nut 112 can be threaded onto or screwed onto each threaded end 110. The external diameter of the beam end tube nut 112 is greater than the external diameter of the passageways 84. By tightly screwing the beam end tube nuts 112 onto the threaded end 110 the tube nuts 112 can be screwed tightly against the exterior surface of the tw spaced-apart depending legs 82. This definitely positions the beam end tube 108 in the spaced-apart legs 82 of the beam hanger axle bracket and also definitely positions the beam end tube 108 with respect to the inner tube 90.

Again, with the use of the vehicle the rubber end bushings 92 become worn and tend to deteriorate and lose their value as a shock absorber between the beam hanger axle bracket and the equalizer beam assembly. In time the rubber beam end bushings 92 must be replaced in order to have a satisfactory ride for the vehicle 20.

Prior to this invention in the adapter type of bearing structure there was used a chisel. In the circumscribing ridge 106 there was a recess 118. As is seen in the drawings the inner tube of the beam end bushing is locked to the beam hanger axle bracket legs, by pressure of the adapter bolt 100. The bolt 100 pulls the adapters 94 against the outer surface. To facilitate the removal of the adapters 94 the relief 118 or the recess 118 is provided on each side of the circumscribing ridge 106 of the adapter 94 for chisel entry. The draw bolt 100 is removed and then the chisel is driven into the recess 118 on one side of the adapter 94 and then into the recess 118 on the side of the other adapter 94. This action of the chisel wedges out the adapter. The time consumed for wedging out the adapter 94 can be a considerable amount of time. Over a number of miles of travel the adapter has received water and dust and dirt and the like. The adapter 94 may be partially rusted to the passageway 84 and the legs 82 of the body 80. Again, it can be a time consuming and messy operation for removing the adapter 94 from the inner tube 90.

In regard to the tube type bushing the inner tube 90 of the rubber beam end bushing is prevented from turning on the beam end tube 108 by legs 82 of the beam hanger pressing against the ends of the inner tube 90 due to the action of the beam end tube nuts 112. The two-and-one-half inch diameter tube 108 has self-locking nuts 112 at each end. This tube can sometimes be removed by removing the nuts and using a spacer bushing between one nut and the beam hanger. With the tightening of the one nut the tube may be pulled loose. Again, with the passage of a number of miles and under different weather conditions there is moisture and dirt and the like and the beam end tube 108 may be partially somewhat rusted and difficult to remove. If this method does not loosen the tube a possible hacksaw can be used to saw through the tube along the inside surface of the beam hanger bracket legs.

Some repair places use a cutting torch such as acetylene cutting torch for cutting the inner tube 90 and also the rubber beam end bushing 92 and the adapters 94. A cutting torch can also be used for cutting the beam end bushing 92 and the beam end tube 108. The manufacturer recommends that a cutting torch not be used as some of the equalizer beams 60 are a heat treated aluminum alloy.

Figure 4:
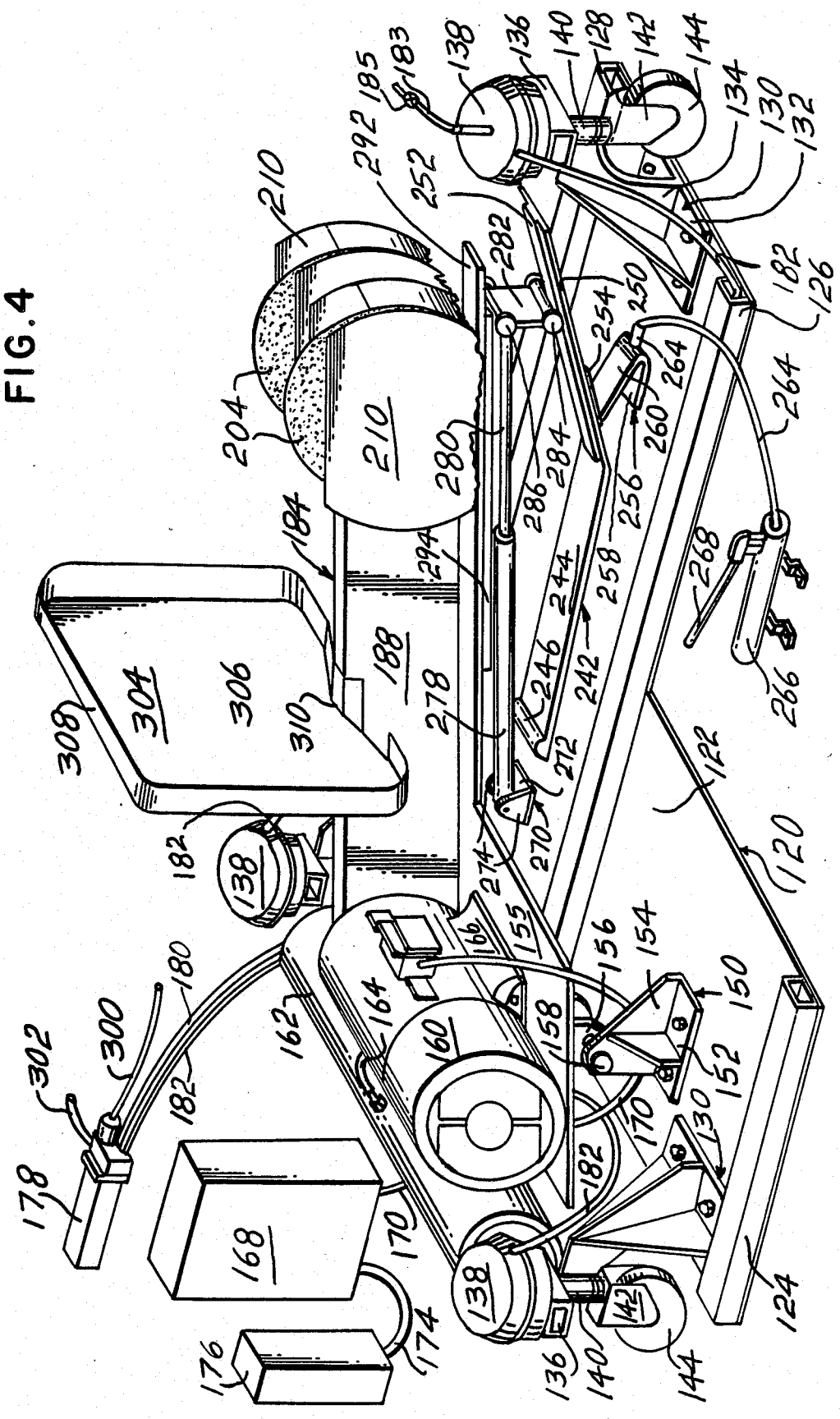
FIG. 4 is an axonometric view of this invention and one species of severing means for severing the beam end connection assembly.
Figure 5:
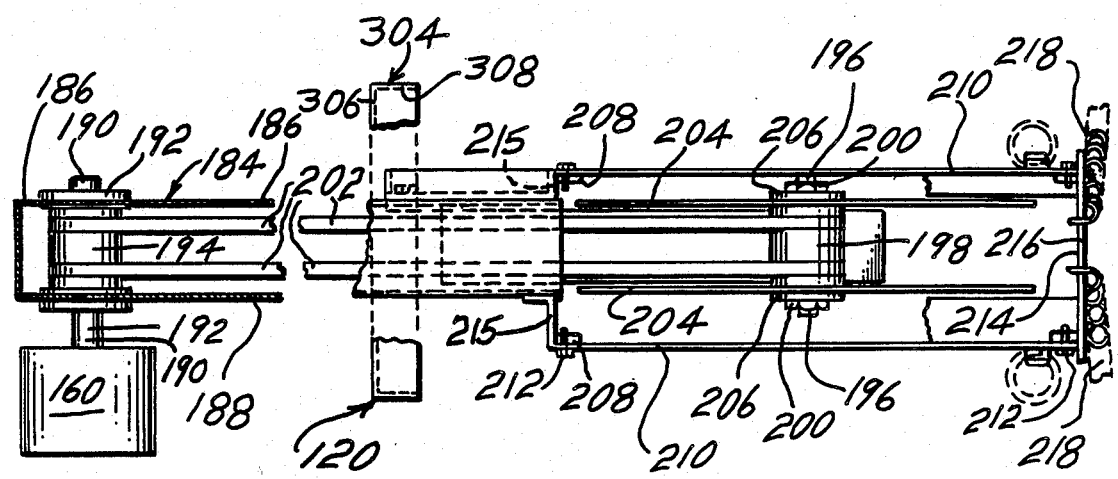
FIG. 5 is a fragmentary top plan view of the invention and illustrates the two spaced apart severing discs.

In FIG. 4 there is an axonometric view of a bushing severing means 120. The bushing severing means 120 comprises a base 122 of a generally L configuration. The base 122 comprises a one-half inch steel plate. Then, it is seen that there is a short reinforcing tube 124 at the lower left and on the outer edge of the base. Then, there is a long central reinforcing tube 126 at approximately the middle part of the base. Then, on the far upper edge there is a reinforcing tube 128.

There are three spaced apart supports 130. One is at the right. Then there are two spaced apart supports 130, one at the upper left and one at the upper right. In other words, there are three spaced apart supports on the base 122. Each support 130 comprises a lower part 132 which can be welded or bolted to the upper surface of the base 122. Then there are a plurality of upright members 134. On the outer part of the upright members 134 there is a mounting tube 136. There is positioned on top of mounting tube 136 an air chamber 138. It is seen that below the mounting tube 136 that there is an extension guide cylinder 140. There connects with the extension guide cylinder 140 a wheel bracket 142. The wheel bracket supports and houses a wheel 144.

On the upper surface of the base 122 are two spaced apart mounting brackets 150. Each of the brackets 150 comprises a base 152 which may be welded to the base 122 or attached by means of bolts or rivets to the base 122. Each of the brackets 150 comprises upright supports 154.

There is a rotatable platform 155. Underneath the rotatable platform 155 are mounting lugs 156. There are aligned passageways in the upright supports 154 and the mounting lugs 156. In these aligned passageways there is a shaft 158. This shaft 158 makes it possible for the rotatable platform 155 to rotate with respect to the base 122.

On top of the rotatable platform 155 there is an electric motor and compressor combination 160. There is also positioned on the two rearward supports 130 an airtank 162. A connecting hose 164 connects the electric motor and compressor combination 160 with the airtank 162. The electric motor and compressor combination 160 is positioned on the rotatable platform 155 by means of a mounting bracket 166.

There is a magnetic starter 168 which connects with the electric motor and compressor combination 160 by means of an electric cord 170. The magnetic starter 168 by means of an electric cord 174 connects with a source of electricity 176. The source of electricity 176 will, normally, be a 220 volt AC or a 440 volt AC, 60 hertz.

There is a remote control 178 for the pneumatic units 138. A pneumatic line 180 connects with the airtank 162 and with the remote control 178. A pneumatic line 182 connects with remote control 178 and also with the three air chambers 138. By means of remote control 178 it is possible to actuate the air chambers 138 to move the wheel bracket 142 downwardly and the wheel 144 downwardly so as to contact the ground or floor. With the wheel bracket 142 retracted and with the wheel 144 retracted the wheel 144 does not touch the ground or floor.

There is a housing 184, see FIGS. 4, 5, 6 and 8. The housing 184 comprises two spaced apart sidewalls 186 and 188. Also, there is a top wall and a lower wall.

The electric motor and compressor combination has an output shaft 190. In the sidewall 186 and in the sidewall 188 there is positioned a bearing 192. The output shaft 190 is positioned in the bearings 192. There is positioned on the output shaft 190 and between the bearings 192 a pulley 194.

Figure 6:
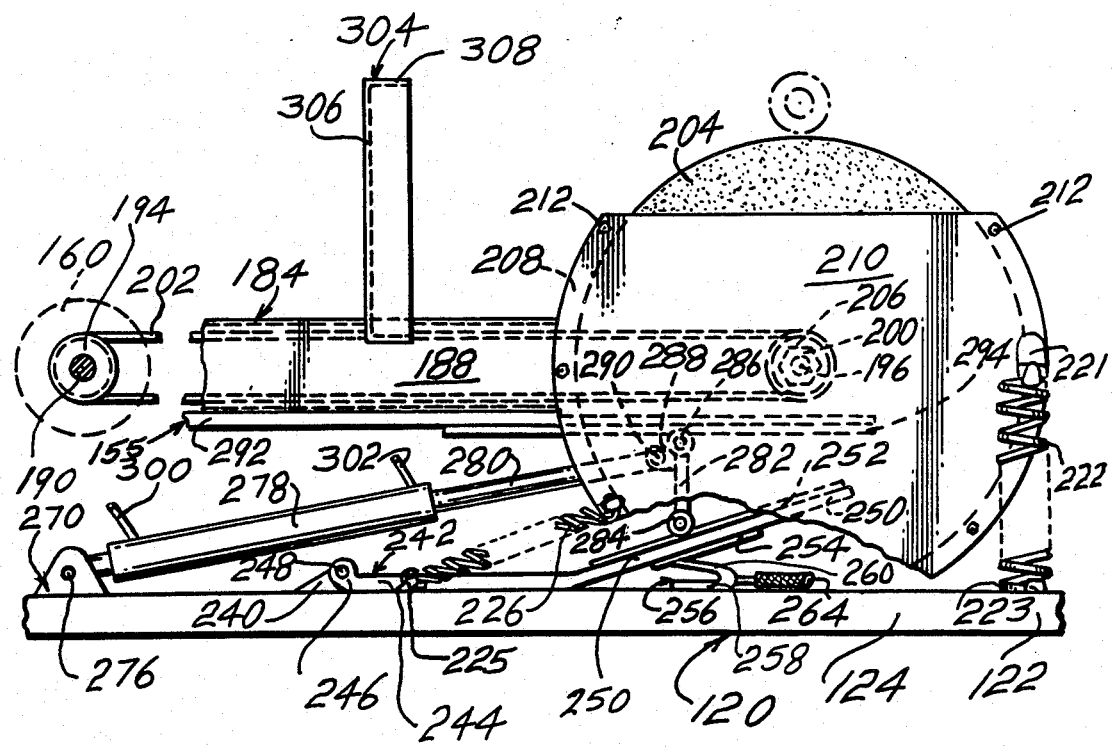
FIG. 6 is a fragmentary side elevational view of the subject invention in a lowered position with respect to a beam end connection assembly.

On the outer end, see FIG. 6, of the sidewalls 186 and 188 there is a shaft 196. Naturally, in the outer ends of the sidewalls 186 and 188 there are aligned passageways for receiving the shaft 196. There is mounted on the shaft 196 a pulley 198.

On the outer ends of the threaded shaft 196 there are nuts 200.

There are drive belts 202 running around the pulley 194 and also around the pulley 198. On the outside of the pulley 198 are two spaced apart ceramic discs 204, viz., two spaced apart abrasive discs 204. The abrasive discs 204 can be tungsten abrasive discs or other suitable abrasive discs.

Outside of each of the discs 204 there is a bearing 206 positioned between the disc 204 and the adjacent nut 200.

Near the middle portion of the housing 184 and outside of the housing 184 are two semi-circular flanges 208. On the outside of each disc 204 there is a protective cover 210. The protective cover 210 is mounted onto the semi-circular flange 208 by means of bolts 212.

The housing 184 also comprises two spaced apart circular angle irons 215. In FIG. 6 it is seen that there is an opening 214 between the two spaced apart circular angle irons 215, see the right part of FIG. 6. There is a bar 216 across this opening in which the bar is attached to the angle irons 215 by nuts and bolts or by welding. There are two springs 218 which connect with the bar 216 and also connect with the base 122. The springs 218 attach to a catch 220 on the upper part of the base 122.

Figure 7:
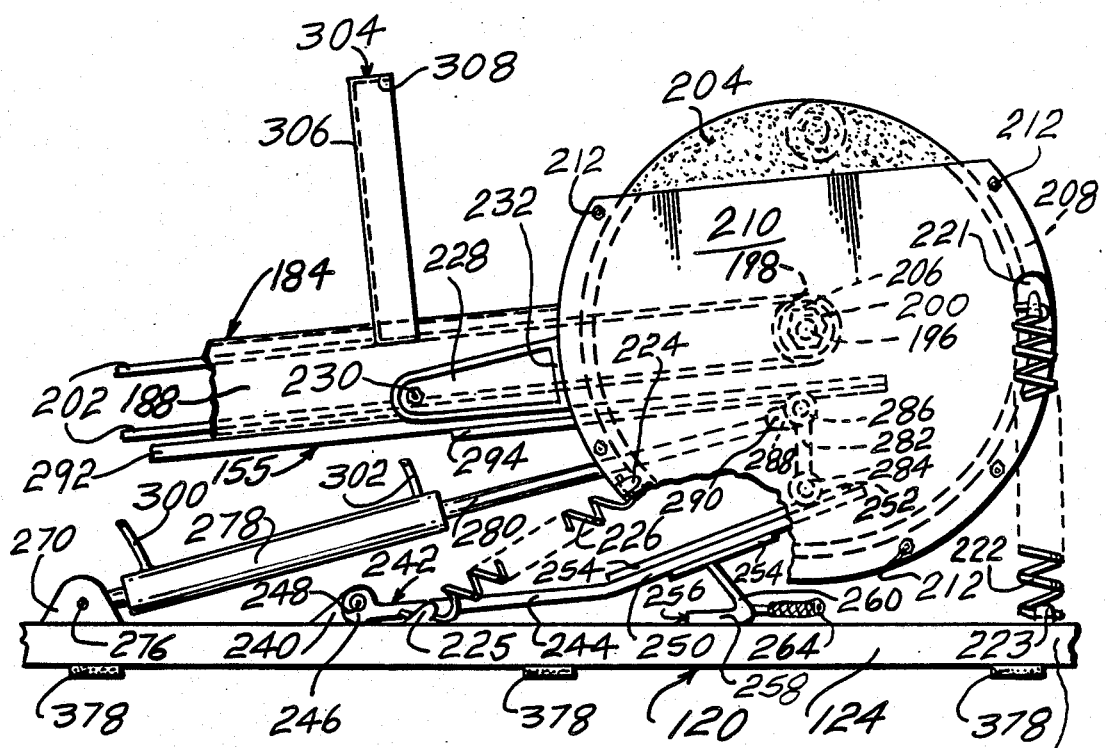
FIG. 7 is a fragmentary side elevational view of the invention in a elevated position and severing a beam end connection assembly.
Figure 8:
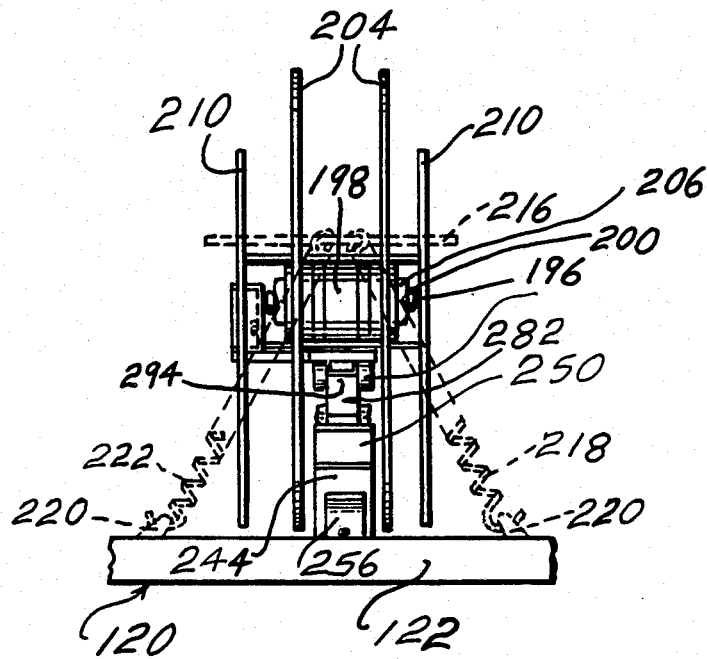
FIG. 8 is an end elevational view illustrating the two severing discs.

On the outer end, see FIG. 7, the right end, there are two spaced-apart catches 223. Also, on each of the protective covers 210 there is a catch 221. A spring 222 attaches to the catch 221 and also the catch 223.

With respect to FIG. 7 it is seen that on the protective cover 210 and to the left that there is a catch 224. On the base 122 there is a catch 225. A spring 226 connects with the catch 224 and also with the catch 225.

There is on the outside of each sidewall 186 and 188 of housing 184 a support 228. A bolt 230 attaches said support 228 to the housing 184. On the right end of the support 228, see FIG. 7, there is a curved brace 232. The curved brace 232 connects with the spacedapart circular angle irons 215.

With respect to FIG. 6 it is seen that on the upper surface of the base 122 there is a mounting bracket 240. The mounting bracket 240 connects with a rotatable support 242 having a first arm 244. On the left end of the first arm 244 there is an enlarged end 246. The mounting bracket 240 and the enlarged end 246 have aligned passageways for receiving a pin 248. This makes it possible for the rotatable support 242 to rotate around the pin 248 or around the mounting bracket 240. The rotatable support 242 also has a second arm 250 which curves upwardly from the first arm 244. On the upper surface of the second arm 250 there is a guide 252.

On the underneath surface of the arm 250 there is a attaching support 254.

On the upper surface of the base 122 and below the second arm 250 there is mounted an inflatable tube 256. The inflatable tube 256 has a base arm 258 which connects with the upper surface of the base 122. Also, the inflatable tube 256 comprises a moveable arm 260.

A flexible tube 264 connects with the inflatable tube 256. The flexible tube 264 connects with a pump 266. The pump 266 has a handle 268. By pumping the handle 268 the inflatable tube 256 can be inflated and this elevates the rotatable support 242 upwardly so that the second arm 250 moves upwardly.

It is seem that underneath the rotatable platform 155 and on the upper surface of the base 122 that there is a mounting bracket 270 having a base 272 and two spaced apart upwardly directed brackets 274. There is a fluid actuated cylinder 278. A pin 276 projects through the two spaced apart brackets 274 and the fluid cylinder 278. The fluid cylinder 278 and the mounting bracket 270 are capable of rotating with respect to each other. The fluid actuated cylinder 278 has an extensible and retractable ram 280.

There is an upright guide 282 having two lower spaced apart wheels 284. The lower wheels 284 are capable of rotating with respect to the upright guide 282.

On the upright guide 282 are two spaced apart upper wheels 286. The upper wheels 286 are capable of rotating with respect to the upright guide 282. There is connected to the upper part of the upright guide 282a lug 288. A pin 290 joins the lug 288 and the extensible ram 280. The extensible ram 280 and lug 288 are free to rotate through a small angle with respect to each other.

The rotatable platform 155 has an arm 292 which extends underneath the housing 184 and also underneath the pulley 198.

On the underneath side of the arm 292 there is a guide 294. The upper wheels 286 are on the outside of the guide 294. The guide 294 maintains the upper wheels 286 in a path underneath the arm 292.

On the upper surface of the arm 250 there is a guide 252. The lower wheels 284 are on the outside of the guide 252. The guide 252 guides the lower wheels 284 and therefore the upright guide 282.

The lower wheels 284 are in contact with the upper surface of the arm 250.

The upper wheels 286 are in contact with the lower surface of the arm 292.

An extending hose 300 connects with remote control 178 and with the fluid actuated cylinder 278.

A retracting hose 302 connects with the remote control 178 and with the fluid actuated cylinder 278.

By means of the remote control 178 it is possible to actuate the cylinder 278 to extend the ram 280 so that the guide 282 runs up the arm 250. Also, by means of the remote control 178 it is possible to retract the ram 280 so that the guide 282 runs down the arm 250.

There is a housing guard 304 for mounting on the housing 184 and between the abrasive discs 204 and the remote control 178. This guard 304 is to protect the operator and the motor assembly from cutting debris. The operator is positioned away from the abrasive discs 204 and holds the remote control 178. The guard 304 is to protect the operator, the motor, drive pulleys, drive belts, etc. in case one of the abrasive discs 204 disintegrates and throws off pieces of the disc.

The guard 304 comprises a base plate 306 and a circumscribing rim 308.

In the lower part of the circumscribing rim 308 there is a mounting recess 310 for mounting the guard 304 over the housing 184.

In FIGS. 12, 13 and 14 there is illustrated a set 320 of supporting blocks. It is to be understood that there are in a set 320 two complete units, one for each side of the truck or trailer.

There is an incline block 322 which has an incline surface 324 and a supporting surface 326. Naturally, the incline surface 324 is to allow the wheels of the truck or trailer to move upwardly off of the ground 327 and onto the blocks.

There is, rearwardly, of the incline block 322 a forward block 328 having a supporting surface 330.

There is rearwardly of the forward block 328 a removable block 332 having an upper surface 334.

There is rearwardly of the removable block 332 a rearward block 336 having a supporting surface 338. On the rearward part of the rearward block 336 there is a blocking ledge 340 so that the rear wheels of the truck or trailer or tractor will not back over the rearward block 336 and be off of the rearward block 336.

In FIG. 12 there is the illustration of a tractor 342 having the outer rearward tire 344 on the supporting surface 338 of the rearward block 336. Also, in FIG. 12 there is an illustration of the tractor 342 having the outer forward tire 346 on the supporting surface 330 of the forward block 328.

In FIG. 13 it is seen that the outer rearward tires 344 are on the supporting surfaces 338 of the rearward block 336 while the inner rearward tires 348 are not on any surface and are suspended above the ground or are suspended above the floor.

After the tires of the tractor 342 or the trailer are positioned on the blocks 336 and 328 the removable block 332 is removed and the incline block 342 is removed. This leaves only the blocks 336 and 338. This makes it possible for the person replacing the bushings to move underneath the tractor or trailer or truck.

The height of the blocks in the set 320 is approximately twelve and one half (12½) inches.

The width of the blocks is approximately eleven (11) inches.

The diameter of the tires can vary but the diameter is approximately forty two (42) inches outside diameter.

The length of the rearward block 336 is about twenty eight (28) inches.

The length of the removable block 332 is about sixteen (16) inches.

The length of the forward block 328 is about twenty two (22) inches.

The length of the incline block 322 is about thirty eight (38) inches with the supporting surface 326 at about sixteen (16) inches in length and the horizontal surface of the incline surface 324 is about twenty two (22) inches in length.

The distance between the two spaced apart rearward blocks 336 and also the distance between the two spaced apart forward blocks 328 is about seventy four (74) inches. This makes it possible for the outer tires of the tractor or trailer or truck to be positioned on the upper surface of the blocks and also makes it possible for the inner tires to be suspended or not supported on any structure.

In FIGS. 19 and 20 there is illustrated an indicating means for indicating when the rotatable platform 155 has been elevated the maximum desired height. With the rotatable platform 155 elevated to the maximum desired height the two ceramic discs 204 are also elevated to a sufficient height to cut through the rubber bushing 92 of the adapter type beam end connection or the tube type beam end connection.

In FIGS. 19 and 20 it is seen that the rotatable platform 155 has an arm 292 and on the underneath surface of the arm 292 there is a guide 294. The width of the guide 294 is less than the width of the arm 292. The two spaced apart upper wheels 286 are underneath the arm 292 and on the outside of the guide 294. Underneath the arm 292 and to one side of the guide 294 there is a switch 360. The switch 360 comprises a first electrode or first contact 362. Also, there is a second electrode or a second contact 364.

A lead 366 connects with the first electrode 362 and with an indicator 368 which is an electric light or a buzzer or the like. The indicator 368 by means of a lead 370 connects with the source of electricity 176. The source of electricity 372 connects with the second electrode or second contact 364. A spring 373 connects with second electrode 364 and positions the second electrode 364 away from the first electrode 362 so that the circuit is an open circuit. With the movement of the upper wheels toward the switch 360 the rotatable platform 155 rotates upwardly so that the arm 292 rotates upwardly. With the rotation of the arm 292 upwardly the abrasive discs 204 rotate upwardly so as to abrade through the rubber bushing of the beam end connection assembly. In order to limit the upward rotation of the rotatable platform 155 and the abrasive discs 204 it is necessary to know the maximum desired height of the rotatable platform 155 and the abrasive discs 204. The reader is to recall that there is positioned between the abrasive discs 204 and the operator of the bushing severing means 120 a guard 304. The operator cannot see, because of guard 304, the two spaced apart abrasive discs 204 moving through the rubber bushing of the beam end connection assembly. Therefore, for the operator to know the maximum desired height of the rotatable platform 155 and the abrasive discs 204 it is necessary to have an indicator. The switch 360 and the indicator 368 indicate to the operator the maximum desired height of the abrasive discs 204. The maximum desired height of the abrasive discs 204 is slightly above the top of the rubber bushings in the beam end connection assembly so as to assure the severing of the rubber bushings and also the metal tubes.

The bushing severing means 120 is mobilized by the three pneumatically equipped wheels 144. The airtank is filled with air from an electric motor and compressor combination 160. The remote control 178 is activated to charge the air chambers 138 associated with the wheels 144. The wheels 144 are forced downwardly thereby making it possible to move the bushing severing means 120 on the floor The two spaced apart abrasive discs 204 are aligned under the bushing of the beam end connection. The beam end connection can be the adapter type or the tube type. In FIG. 4, at the right end, it is seen that there is a bleed off line 183 and controlling valve 185 on the chamber 138. With the opening of the valve 185 the air is released from the chambers 138 and the base 122 settles downwardly so as to rest on the floor and not be maneuverable or mobile in this position. The manually controlled pump 266 is activated or pumped to raise the ramp 242 or the rotatable support 242 so as to bring the two spaced apart abrasive discs to the point of entry to the rubber bushings. Then, the steel guard 304 is placed on the housing 184. The guard 304 is positioned between the two spaced apart abrasive discs 204 and the operator so that if one of the discs disintergrates or an accident occurs then the guard will protect the operator so that the operator is not hurt.

The electric motor is connected to the remote magnetic starter 168. The starter 168 is connected into the power source 176. The power source 176 would normally be 220 volts AC or 440 volts AC with a frequency of 60 hertz. As is recalled the fluid actuated cylinder 278 is connected to a source of fluid under pressure such as the airtank 162. It is a designer's prerogative as to the use of air (pneumatic) or oil (hydraulic) as a fluid for the fluid actuated cylinder 278. The remote control 178 makes it possible to start the rotation of the two spaced apart abrasive discs 204. A belt or a chain drive runs between the output shaft of the electric motor and the electric motor and compressor combination 160 and the pulley for the two spaced apart abrasive discs 204. With the remote control 178 fluid can be forced into the fluid cylinder 278 so as to extend the ram 280. With the extension of the ram 280 the upright guide 282 runs upwardly on the upper surface of the arm 250. The arm 250 has been elevated by means of the manually controlled pump 266, as previously explained. With the upright guide 282 running upwardly on the upper surface of the arm 250 the rotatable platform 155 is elevated so that the two spaced apart abrasive discs abrade through the bushings of the beam connections, either adapter type or tube type. Also, with the upright guide 282 moving upwardly on the arm 250 the rotatable platform 155 is rotated upwardly so that the two spaced apart abrasive discs abrade through the rubber bushing and the metal tubes and the upper wheel 286 runs over the second electrode or second contact 364, which is flexible, so that the second electrode 364 is in contact with the first electrode 362 to close the electric curcuit and activate the indicator 368 which can be a light or a bell. The activation of the indicator 368 tells the operator that the two spaced apart abrasive discs have reached the desired elevation and have abraded through the rubber bushings and the metal tubes. Then, the remote control 178 can be activated so that the ram 280 is retracted within the cylinder 278. This allows the upright guide 282 to run downwardly on the upper surface of the arm 250 to allow the rotatable platform 155 to rotate downwardly and to allow the two spaced apart abrasive discs 204 to move downwardly and away from the severed rubber bushing and the severed metal tube. The electric motor and compressor combination 160 can be deactivated.

The manual pump 266 can be released so that the arm 250 is allowed to rotate downwardly.

The air chambers 138 are charged with air to lower the wheels 144 and to elevate the base 122. This makes possible the movement of the bushing severing means 120 on the floor or ground 327.

On the bottom of the base 122 there can be a plurality of plastic or rubber pads 378 to assist in stabilizing the bushing severing means 120 while the spaced apart abrasive discs are severing the bushing and metal tube.

In FIGS. 15 and 16 there is a schematic illustration of laser severing means 280. The means 280 comprises a cart 282 having a base 284. On the underneath side of the base 284 there are four spaced apart wheel brackets 286. The wheel brackets house wheels 288. A shaft 290 connects with the wheel bracket 286 and with the wheel 288.

On the upper surface of the base 284 there is a platform 292. In FIG. 16 there is seen that in the platform 292 that there are two spaced apart recesses 294. There is also a central recess 296.

There is a control box 298. The control box has two through shafts 300. On the outer ends of each shaft 300 there are wheels 302. The wheels 302 are in the recesses 294. It is seen that the recesses 294 are guides for the wheels 302 which in turn guide the control box 298.

In the control box 298 are two spaced apart laser units 304, see FIG. 16. The laser units 304 direct upwardly two laser beams 306.

There is a source of energy or electricity 308. The leads 310 and 312 connect to 308 and also with the control box 298.

There are handle units 314 for ease of moving the cart 282.

The laser beams 306 can sever the beam end connection assembly 316, in phantom, in FIGS. 15 and 16.

It is seen that the operator can maneuver the cart 282 by means of the handle unit 314. When the cart 282 is in the proper position then the operator can move the control box 298. With the movement of the control box 298 the laser beams 306 can sever the beam end connection assembly 316 and by severing this beam end connection assembly 316 the rubber bushing is severed and also the metal tube is severed.

Another means for severing the rubber bushing and the metal tube and the beam end connection assembly 316 is a shear severing means 318. Again, there is a cart 282. In the central part of the cart 282 and on the upper surface of the base 284 there is a support 320. The support 320 houses a shaft 322. There are two spaced apart shears 324 mounted on each end of the shaft 322. On the lower end of each of the shears 324 there is a bracket 326.

Near each end of the base 284 there is an upright pedestal 328 on the upper surface of the base 284. Also, there is a brace 330 connecting with the pedestal 328 and the base 284. The pedestal houses a shaft 332. There is a cylinder 334 connecting with the shaft 332. The cylinder 334 can rotate with respect to the shaft and also the pedestal 328. In FIG. 17 it is seen that there are two spaced apart cylinders 334 with a cylinder mounted on each pedestal 328. Each cylinder 334 has a ram 336. The outer end of a ram 336 connects with the respective bracket 326 by means of a pin.

There is a motor and pump combination 338. The motor and pump combination connects by means of lines 340 and 342 with the cylinder 334. By proper actuation of the motor and pump combination 338 the ram 336, of each cylinder 334, can be extended so as to rotate the two shears 324 toward each other and thereby sever the beam end connection assembly 316 comprising the rubber bushing and the metal tube. Also, by proper actuation of the motor and pump combination 338 the rams can be retracted and thereby the shears 324 rotate away from each other.

In operation the shear severing means 318 can be moved underneath the beam end connection assembly of the truck, tractor or trailer. Then, the motor and pump combination 338 can be activated so that the shears 324 move toward each other and sever the rubber bushing and also the metal tube. After the rubber bushing and metal tube have been severed the motor and pump combination 338 can be activated and then the shears 324 rotate away from each other so that the shear severing means 318 can be moved away from the beam end connection assembly to allow the rubber bushing and the metal tube to be replaced.

RESUMÉ

As a resumé of the foregoing there is a beam end connection assembly in a walking beam. A walking beam comprises beam hanger axle brackets, 65 and 69, having two spaced apart legs and an equalizer beam 60. The equalizer beam is positioned between the two spaced apart legs.

The beam end connection assembly connects with the two spaced apart legs of the beam hanger axle bracket and also the equalizer beam. The beam end connection assembly comprises an inner metal tube 90 and a rubber bushing. The inner metal tube 90 is positioned in the two legs of the beam hanger axle bracket and also in the equalizer beam. The rubber bushing 92 surrounds the inner metal tube 90 and is positioned in the equalizer beam.

The walking beam is in a tractor or trailer or truck. With the use of the tractor or trailer or truck the rubber bushing wears and ceases to properly function. Then, it is necessary to remove the rubber bushing and insert a new rubber bushing. Prior to this invention the removal of the rubber bushing and the insertion of a new rubber bushing was time consuming and required approximately 12 to 14 hours to replace four beam end connection assemblies.

This invention is directed to replacing four beam end connection assemblies in a time period of approximately two hours. The inner metal tube and the rubber bushing are severed between the equalizer beam and the beam hanger axle bracket. Preferably, the inner metal tube and the rubber bushing are simultaneously severed in two places so as to have uniform treatment of the beam end connection assembly and also to save time. If the inner metal tube was severed between the equalizer beam and one leg of the beam hanger axle bracket the equalizer beam and the beam hanger axle bracket could move with respect to each other so as to cant or twist the inner metal tube thereby making it more difficult to sever the inner metal tube between the equalizer beam and the other leg of the beam hanger axle bracket.

After the inner metal tube and the rubber bushing have been severed the remnants or remaining pieces can be removed from the equalizer beam and also from the legs of the beam hanger axle bracket. At that time it is possible to position a new beam end connection assembly in the legs of the beam hanger axle bracket and in the equalizer beam.

The rubber bushing and the inner metal tube can be severed by a severing means. One of the severing means can have an abrasive surface such as sand, tungsten carbide, diamond and the like. I have found that two spaced apart abrasive discs 204 work well. These abrasive discs 204 rotate so that the abrasive surface or abrasive edge severs the rubber bushing and the inner metal tube.

Also, a laser beam can be used for severing the rubber bushing and the inner metal tube. Two spaced apart laser beams can be passed underneath the walking beam and positioned so as to sever the rubber bushing and the inner metal tube.

Further, a pincer can be used for severing the rubber bushing and the inner metal tube. Two spaced apart pincers can be used for pinching the rubber bushing and the inner metal tube between the equalizer beam and the two spaced apart legs of the beam hanger axle bracket.

The apparatus is a bushing severing means 120. Two spaced apart abrasive discs 204 are used to sever the rubber bushing and the inner metal tube. The apparatus comprises a means to elevate the two spaced apart abrasive discs to the proper height to sever the inner metal tube and the rubber bushing. An electric motor 160 and an output shaft 190 are the power means or the source of power for rotating the discs 204. The discs 204 are spaced apart on a shaft 196. Drive belts 202 operatively connect the shafts 190 and 196 so that the two abrasive discs 204 rotate to sever the rubber bushing and the inner metal tube. The bushing severing means 120 is mounted on a mobil base 122 so that the means 120 can be moved underneath the walking beam to sever the rubber bushing and inner metal tube and then can be moved away from the walking beam.

For ease of operation of the bushing severing means 120 there are provided two sets of four blocks, 338, 332, 328 and 322. The tractor or trailer or truck is positioned on these four blocks so that it is elevated off of the floor. Two of the blocks, 332 and 322, are removed so as to leave blocks 338 and 328. This permits ease of movement of the bushing severing means 120 underneath the walking beam of the tractor or truck or trailer.

Again, after the rubber bushing and the inner metal tube have been severed it is possible to remove the remnants of the beam end connection assembly and to install a new beam end connection assembly with a new or fresh rubber bushing.

Prior to preparing this patent application a patent search was made. The patent search revealed four patents. These patents are:

| PATENTEE | ISSUING DATE | NUMBER |
| --- | --- | --- |
| A. E. Mullet | | 3,032,956 |
| W. A. West | 18 May, 1965 | 3,183,585 |
| J. A. Lange | 20 June, 1967 | 3,325,946 |
| H. W. Rutherford | 30 May, 1978 | 4,091,518 |

The patent to Mullet discloses a brush cutting machine having a rotary cutting head 2 with peripheral teeth 38. The subject invention is not a brush cutting machine and differs from the patent to Mullet.

The patent to West illustrates a ram for pushing out the center metal core of only a center bushing. The subject invention is different than a ram and is not anticipated by West.

The patent to Lange illustrates the cut-off machine using an abrasive wheel 12. Lange is not directed to removing and replacing the beam end connection assembly in a walking beam.

Rutherford illustrates a method for repairing a cylindrical water tank. This apparatus is not directed to repairing a walking beam and a beam end connection assembly.

Prior to filing this Patent Application a disclosure document was filed on 15 June 1984, No. 128,385. It is asked that this disclosure document be made a permanent record in this patent application.

35 U.S.C. 101 states:

Invention patentable

"Whoever invents or discovers any new and useful process, machine, manufacture, or composition of matter, or any new and useful improvement thereof may obtain a patent therefor, subject to the conditions and requirements of this title."

I consider that the subject matter of this patent application and that this invention is new and useful as I have provided a process and also a machine for replacing the beam end connection assembly in a walking beam. Prior to my invention the time required for replacing a beam end connection assembly was approximately 12 to 14 hours. With my invention it is possible to replace the beam end connection assembly in a time period of about two hours. This time period is for replacing the four rubber bushings and four metal tubes connecting a beam hanger axle bracket and an equalizer beam.

35 U.S.C. 1 states:

Conditions for patentability; non-obvious subject matter

"A patent may not be obtained though the invention is not identically disclosed or described as set forth in section 102 of this title, if the differences between the subject matter sought to be patented and the prior art are such that the subject matter as a whole would have been obvious at the time the invention was made to a person having ordinary skill in the art to which said subject matter pertains.

Patentability shall not be negatived by the manner in which the invention was made."

I consider my invention to be new and unobvious in that I have never seen such an apparatus and method for replacing the beam end connection assembly in a walking beam. A patent search was made and the patent search did not disclose such a method and apparatus. Further, I have been in the business of replacing beam end connection assemblies and have found that, prior to my invention, the task was difficult in that the person with a hammer and a chisel usually knocked out the parts so as to remove the components of the beam end connection assembly for exposing the inner metal tube and the rubbing bushing. With my invention it is possible to expose the inner metal and the rubber bushing in a short period of time and to insert a new beam end connection assembly between the equalizer beam and the beam hanger axle bracket. To the best of my knowledge and information I have never seen anyone or heard of anyone using an apparatus or a method similar to the apparatus I have disclosed in this patent application. Therefore, I consider this invention to be new and unobvious.

From the foregoing it is seen that I have provided a method for removing a beam end connection assembly in an equalizer beam and in a beam hanger axle bracket wherein the method comprises substantially, simultaneously, severing an inner tube and a beam end bushing on both side of said equalizer beam and between two legs of said beam end hanger axle bracket and then removing the balance of said beam end connection assembly from said equalizer beam hanger axle bracket. The severing of the inner tube and the beam end bushing can be accomplished with an abrasive means. The beam end connection assembly can be of an adapter type having an inner tube with a first open end and a second open end. There is a first adapter at the first end. There is a second adapter at the second end. A second means connects together said first adapter and said second adapter to position said beam end connection assembly and beam hanger axle bracket. The second means can comprise a nut and a bolt. The beam end connection assembly can comprise a beam end tube. The beam end tube has a first end and a second end with the first end threaded and the second end threaded. A nut can be on the first threaded end and outside of the beam hanger axle bracket and the nut can be on the second threaded end on the outside of the beam hanger axle bracket.

The method comprises substantially, simultaneously, severing said inner tube and said beam end bushing on both sides of said equalizer beam and between said two legs. Then, the balance of the beam end connection assembly can be removed from the beam end hanger axle bracket and the equalizer beam. At that time it is possible to position a second beam end connection assembly at said beam hanger axle bracket and in said equalizer beam.

Also, I have provided an apparatus for removing a beam end connection assembly and an equalizer beam and a beam end axle bracket wherein said apparatus comprises a severing means for severing an inner tube and a beam end bushing of said beam end connection assembly on both sides of said equalizer beam and between two legs of said beam hanger axle bracket. There is a first means for positioning said severing means in a position to sever said inner tube and said beam end bushing and there is a second means for activating said severing means to sever said inner tube and said beam end bushing. The severing means can be an abrasive means comprising two spaced apart abrasive discs. The severing means can also be a laser means comprising two spaced apart laser means or can be two spaced apart pincer means. The apparatus comprises a moveable platform and a moveable support. There is a severing means mounted on the moveable platform. There is a fourth means for elevating said moveable support, said third means, said moveable and said two spaced apart surfaces adjacent to said beam end connection assembly and said third means comprises a guide for moving upwardly on said moveable support to move said two spaced apart abrasive surfaces through said inner tube and said beam end bushing. Also, there is provided a plurality of supporting blocks wherein a first wheel and a first tire are positioned on a supporting block so that said first tire is off of the ground and a second wheel and a second tire is positioned on a supporting block so that said second tire is off of the ground making it possible to position the apparatus underneath the said beam end connection assembly.

The air tank 162 may be charged with air from an in-house air compressor instead of being charged from the motor-air compressor unit 160. Most of the automotive repair units have an in-house air compression system.

In FIG. 21 there is illustrated equalizer beams 60 and torque bar 64. There are tandem axle housings 380 for differentials 382 and drive axles 384. There are beam hanger axle brackets 386 for receiving the equalizer beams 60. The beam hanger axle brackets 386 and the equalizer beam 60 can be joined by an adapter type beam end connection assembly or by a tube type beam end connection assembly which have been previously explained. The brackets 386 are welded at 388 to the underneath part of the axle housings 380. The tandem axle unit of FIG. 21 is used on dump trucks and tractors for driving and for propelling the automotive vehicles. The drive axles 384 are live axles for driving the automotive vehicle as compared with the axles 66 of a trailer which assist in supporting the trailer but do not assist in propelling the trailer.

From the foregoing and having presented by invention,

I claim:

1. A portable apparatus for removing a beam end connection assembly positioned in an equalizer beam and in a beam hanger axle bracket wherein said beam end connection assembly comprises an inner tube and a beam end bushing, said apparatus comprising:
   a. a severing means for severing said inner tube and said beam end bushing of said beam end connection assembly on both sides of said equalizer beam and between two legs of said beam hanger axle bracket, simultaneously;
   b. a first means for positioning said severing means in a position to simultaneously sever said inner tube and said beam end bushing in two spaced apart places; and,
   c. a second means for activating said severing means to simultaneously sever in two spaced apart places said inner tube and said beam end bushing.

2. A portable apparatus for removing a beam end connection assembly positioned in an equalizer beam and in a beam hanger axle bracket according to claim 1 and comprising:
   a. said severing means being an abrasive means.

3. A portable apparatus for removing a beam end connection assembly positioned in an equalizer beam and in a beam hanger axle bracket according to claim 1 and comprising:
   a. said severing means being two spaced apart abrasive surfaces.

4. A portable apparatus for removing a beam end connection assembly positioned in an equalizer beam and in a beam hanger axle bracket according to claim 1 and comprising:
   a. said severing means being two spaced apart abrasive discs.

5. An apparatus for removing a beam end connection assembly in an equalizer beam and in a beam hanger axle bracket according to claim 1 and comprising:
   a. said severing means being a laser means.

6. An apparatus for removing a beam end connection assembly in an equalizer beam and in a beam hanger axle bracket according to claim 1 and comprising:
   a. said severing means being two spaced apart laser means.

7. An apparatus for removing a beam end connection assembly in an equalizer beam and in a beam hanger axle bracket according to claim 1 and comprising:
   a. said severing means being a pincer means.

8. An apparatus for removing a beam end connection assembly in an equalizer beam and in a beam hanger axle bracket according to claim 1 and comprising:
   a. said severing means being two spaced apart pincer means.

9. A portable apparatus for removing a beam end connection assembly positioned in an equalizer beam and in a beam hanger axle bracket according to claim 1 and comprising:
   a. said severing means being two spaced apart abrasive surfaces; and,
   b. a third means for moving said two spaced apart abrasive surfaces through said inner tube and said beam end bracket to simultaneously sever in two spaced apart places said inner tube and said beam end bracket.

10. A portable apparatus for removing a beam end connection assembly positioned in an equalizer beam and in a beam hanger axle bracket according to claim 9 and comprising:
    a. said first means comprising a moveable platform;
    b. a moveable support operatively connecting with said moveable platform;
    c. said third means operatively connecting with said moveable platform and said moveable support; and,
    d. said severing means operatively connecting with said moveable platform.

11. A portable apparatus for removing a beam end connection assembly positioned in an equalizer beam and in a beam hanger axle bracket according to claim 10 and comprising:
    a. a fourth means for elevating said moveable support, said third means, said moveable platform and said two spaced apart abrasive surfaces adjacent to said beam end connection assembly; and,
    b. said third means comprising a guide for moving upwardly on said moveable support to move said two spaced apart abrasive surfaces through said inner tube and said beam end bracket at two spaced apart places.

12. A portable apparatus for removing a beam end connection assembly positioned in an equalizer beam and in a beam hanger axle bracket according to claim 1 and comprising:
    a. said severing means being two spaced apart abrasive surfaces;
    b. said second means rotating said two spaced apart abrasive discs for the purpose of simultaneously severing in two spaced apart places said inner tube and said beam end bracket; and,
    c. a third means for moving said two spaced apart abrasive surfaces through said inner tube and said beam end bracket to simultaneously sever in two spaced apart places said inner tube and said beam end bracket.

13. A portable apparatus for removing a beam end connection assembly positioned in an equalizer beam and in a beam hanger axle bracket according to claim 12 and comprising:
    a. said first means comprising a moveable platform;
    b. a moveable support operatively connecting with said moveable platform;
    c. said third means operatively connecting with said moveable platform and said moveable support; and,
    d. said severing means operatively connecting with said moveable platform.

14. A portable apparatus for removing a beam end connection assembly positioned in an equalizer beam and in a beam hanger axle bracket according to claim 13 and comprising:
    a. a fourth means for elevating said second means, said third means, said moveable platform and said two spaced apart abrasive surfaces adjacent to said beam end connection assembly; and,
    b. said third means comprising a guide for moving upwardly on said moveable support to move said two spaced apart abrasive surfaces through said inner tube and said beam end bracket.

15. An apparatus for removing a beam end connection assembly positioned in an equalizer beam and in a beam hanger axle bracket wherein said beam end connection assembly comprises an inner tube and a beam end bushing, said apparatus comprising:
    a. a severing means for severing said inner tube and said end bushing of said beam end connection assembly on both sides of said equalizer beam and between two legs of said beam hanger axle bracket, simultaneously;
    b. a first means for positioning said severing means in a position to simultaneously sever said inner tube and said beam end bushing in two spaced apart places;
    c. a second means for activating said severing means to simultaneously sever in two spaced apart places said inner tube and said beam end bushing;
    d. said severing means being two spaced apart abrasive surfaces;
    e. a third means for moving said two spaced apart abrasive surfaces through said inner tube and said beam end bracket to simultaneously sever in two spaced apart places said inner tube and said beam end bracket;
    f. said first means comprising a moveable platform;
    g. a moveable support operatively connecting with said moveable platform;
    h. said third means operatively connecting with said moveable platform and said moveable support;
    i. said severing means operatively connecting with said moveable platform;

j. a fourth means for elevating said moveable support, said third means, said moveable platform and said two spaced apart abrasive surfaces adjacent to said beam end connection assembly;
k. said third means comprising a guide for moving upwardly on said moveable support to move said two spaced apart abrasive surfaces through said inner tube and said beam end bracket at two spaced apart places;
l. said fourth means comprising an inflatable tube for elevating said moveable support;
m. said third means comprising a fluid actuated cylinder and a ram connecting with said guide and for moving said guide on said moveable support; and,
n. a motor means operatively connecting with said two spaced apart abrasive surfaces.

16. An apparatus for removing a beam end connection assembly positioned in an equalizer beam and in a beam hanger axle bracket wherein said beam end connection assembly comprises an inner tube and a beam end bushing; said apparatus comprising:
a. a severing means for severing said inner tube and said beam end bushing of said beam end connection assembly on both sides of said equalizer beam and between two legs of said beam hanger axle bracket; simultaneously;
b. a first means for positioning said severing means in a position to simultaneously sever said inner tube and said beam end bushing in two spaced apart places;
c. a second means for activating said severing means to simultaneously sever in two spaced apart places said inner tube and said beam end bushing;
d. said severing means being two spaced apart abrasive discs;
e. said second means rotating said two spaced apart abrasive discs for the purpose of simultaneously severing in two spaced apart places said inner tube and said beam end bracket;
f. a third means for moving said two spaced apart abrasive discs through said inner tube and said beam end to simultaneously sever in two spaced apart places said inner tube and said beam end bracket;
g. said first means comprising a moveable platform;
h. a moveable support operatively connecting with said moveable platform;
i. said third means operatively connecting with said moveable platform and said moveable support;
j. said severing means operatively connecting with said moveable platform;
k. a fourth means for elevating said second means, said third means, said moveable platform and said two spaced apart abrasive discs adjacent to said beam end connection assembly;
l. said third means comprising a guide for moving upwardly on said moveable support to move said two spaced apart abrasive discs through said inner tube and said beam end bracket;
m. said fourth means comprising an inflatable tube for elevating said moveable support;
n. said third means comprising a fluid actuated cylinder and a ram connecting with said guide and for moving said guide on said moveable support; and,
o. a motor means operatively connecting with said two spaced apart abrasive discs for rotating said two spaced apart abrasive discs.

17. An apparatus for removing a beam end connection assembly positioned in an equalizer beam and in a beam hanger axle bracket according to claim 16 and comprising:
a. an indicator means;
b. said indicator means comprising a sensing means to sense the position of said two spaced apart abrasive discs; and,
c. said indicator means comprising an indicator operatively connecting with said sensing means to indicate the position of said two spaced apart abrasive discs.

18. An apparatus for removing a beam end connection assembly positioned in an equalizer beam and in a beam hanger axle bracket according to claim 16 and comprising:
a. a guard; and,
b. a means for mounting said guard on said apparatus to protect an operator if said abrasive disc disintegrates.

19. An apparatus for removing a beam end connection assembly positioned in an equalizer beam and in a beam hanger axle bracket according to claim 18 and comprising:
a. a base;
b. said moveable support being mounted on said base;
c. said moveable platform operatively connecting with said base;
d. a plurality of wheels operatively connecting said base; and,
e. a fifth means for varying the elevation of said wheels to elevate said base to enable said apparatus and said base to rest on the floor.

20. An apparatus for removing a beam end connection assembly positioned in an equalizer beam end in a beam hanger axle bracket according to claim 18 and comprising:
a. said beam end connection assembly comprising part of a walking beam;
b. said walking beam comprising a first beam hanger axle bracket and a second beam hanger axle bracket;
c. said first beam hanger axle bracket and said second beam hanger axle bracket being spaced apart;
d. an equalizer beam connecting with each beam hanger axle bracket;
e. said first beam hanger axle bracket operatively connecting with a first axle and with at least a first wheel and a first tire on said first axle;
f. said second beam hanger axle bracket operatively connecting with a second axle and with at least a second wheel and a second tire on said second axle;
g. said equalizer beam being between the two legs of said first beam hanger axle bracket and being between the two legs of said second beam hanger axle bracket;
h. a beam end connection assembly connecting with said equalizer beam and with said first beam hanger axle bracket;
i. a beam end connection assembly connecting with said equalizer beam and with said second beam hanger axle bracket;
j. said beam end connection assembly comprising an inner tube and a beam end bushing; said apparatus also comprising:
k. a plurality of supporting blocks for supporting said first wheel and for supporting said second wheel;

l. a first supporting block of said supporting blocks for supporting said first wheel and said first tire so that said first tire is off of the ground;

m. a second supporting block of said supporting blocks for supporting said second wheel and said second tire so that said second tire is off of the ground; and, n. said first supporting block being spaced apart from said second supporting block for receiving said apparatus so that said apparatus can be positioned underneath said beam end connection assembly.

21. An apparatus for removing a beam end connection assembly in an equalizer beam and in a beam hanger axle bracket according to claim 20 and comprising:

a. one of said supporting blocks having an inclined surface.

22. An apparatus for removing a beam end connection assembly in an equalizer beam and in a beam hanger axle bracket according to claim 20 and comprising:

a. an indicator means;

b. said indicator means comprising a sensing means to sense the position of said two spaced apart abrasive discs;

c. said indicator means comprising an indicator operatively connecting with said sensing means to indicate the position of said two spaced apart abrasive discs; and, d. the heighth of said first supporting block and the heighth of said second supporting block being of a predetermined height for cooperating with said indicator means to indicate that said inner tube and said beam end bushing have been severed.

* * * * *